United States Patent
Mysore

(10) Patent No.: US 9,160,457 B2
(45) Date of Patent: Oct. 13, 2015

(54) ADAPTIVE COMPENSATION CIRCUITRY FOR SUPPRESSION OF DISTORTIONS GENERATED BY THE DISPERSION-SLOPE OF OPTICAL COMPONENTS

(71) Applicant: Aurora Networks, Inc., San Jose, CA (US)

(72) Inventor: Sudhesh Mysore, Carlsbad, CA (US)

(73) Assignee: AURORA NETWORKS, INC., San Jose, CA (US)

( * ) Notice: Subject to any disclaimer, the term of this patent is extended or adjusted under 35 U.S.C. 154(b) by 0 days.

(21) Appl. No.: 14/302,339

(22) Filed: Jun. 11, 2014

(65) Prior Publication Data

US 2015/0078759 A1    Mar. 19, 2015

Related U.S. Application Data

(60) Provisional application No. 61/834,410, filed on Jun. 12, 2013.

(51) Int. Cl.

| | |
|---|---|
| *H04B 10/04* | (2006.01) |
| *H04B 10/58* | (2013.01) |
| *H04B 10/2513* | (2013.01) |
| *H04B 10/50* | (2013.01) |
| *H04B 10/564* | (2013.01) |

(52) U.S. Cl.
CPC .......... *H04B 10/58* (2013.01); *H04B 10/25133* (2013.01); *H04B 10/503* (2013.01); *H04B 10/564* (2013.01)

(58) Field of Classification Search
CPC ............. H04B 10/25137; H04B 10/58; H04B 10/2507; H04B 10/2525; H04B 10/25253
USPC ......... 398/182, 183, 184, 188, 192, 193, 194, 398/195, 199, 200, 201, 33, 147, 158, 159, 398/161, 135, 136, 196, 197, 198
See application file for complete search history.

(56) References Cited

U.S. PATENT DOCUMENTS

| | | | | |
|---|---|---|---|---|
| 5,252,930 A | * | 10/1993 | Blauvelt | ........................ 330/149 |
| 5,526,159 A | | 6/1996 | Gottwald | |
| 8,073,340 B2 | * | 12/2011 | Ishaug et al. | .................. 398/193 |
| 2009/0196629 A1 | | 8/2009 | Zheng et al. | |

FOREIGN PATENT DOCUMENTS

| | | |
|---|---|---|
| EP | 0524758 | 1/1993 |
| EP | 2124360 | 11/2009 |

OTHER PUBLICATIONS

International Search Report & Written Opinion from PCT/US2014/042114 dated Sep. 25, 2014.

* cited by examiner

Primary Examiner — Hanh Phan
(74) Attorney, Agent, or Firm — John Bruckner PC

(57) ABSTRACT

A distortion compensation circuit compensates for the distortions generated by the dispersion-slope of an optical component and the frequency chirp of an optical transmitter. The dispersion compensation circuitry can be utilized in the optical transmitter, the optical receiver and/or at some intermediate point in a fiber-optic network. One embodiment of the compensation circuit utilizes a primary electrical signal path that receives at least a portion of the input signal and a delay line; and a secondary signal path in parallel to the primary path that receives at least a portion of the input signal and including: an amplifier with an electrical current gain that is proportional to the dispersion-slope of the optical component, an optional RF attenuator, an optional delay line, a "squarer" circuit, and a "differentiator" circuit. Another embodiment of the disclosure performs simultaneous, and independent, compensation of second-order distortions generated by both the dispersion-slope of a first optical component and the dispersion of a second optical component. Other embodiments of the disclosure perform adaptive predistortion for compensation of distortions generated by the dispersion-slope of a first optical component and the dispersion of a second optical component to maintain optimum compensation even if the dispersion properties of the optical components change with time.

18 Claims, 11 Drawing Sheets

ADAPTIVE COMPENSATION CIRCUITRY FOR SUPPRESSION OF DISTORTIONS GENERATED BY THE DISPERSION-SLOPE OF OPTICAL COMPONENTS

CROSS-REFERENCE TO RELATED APPLICATION

Referring to the application data sheet filed herewith, this application claims a benefit of priority under 35 U.S.C. 119(e) from copending provisional patent application U.S. Ser. No. 61/834,410, filed Jun. 12, 2013 the entire contents of which are hereby expressly incorporated herein by reference for all purposes.

BACKGROUND INFORMATION

Transmission of directly modulated lasers (or other light sources) through optical components results in generation of second-order distortion due to the chromatic dispersion properties of the optical components and chirp (i.e., wavelength variations) of the laser (or other light source). Within this application the term optical components is used to denote optical devices that exhibits chromatic dispersion, meaning that the time delay of the signal through the device varies with the optical wavelength. This includes, but is not limited to, both passive components such as optical fiber, optical filters, multiplexers, waveguides, etc. and also active optical components such as optical amplifiers (e.g., EDFAs, Raman amplifiers), modulators, integrated devices, etc.

The composite second-order (CSO) distortion is an indication of the severity of these second-order distortions. CSO distortion due to the chromatic dispersion properties of optical components degrade the performance of continuous-wave (CW) analog signals and pseudo-analog signals such as quadrature-amplitude modulated (QAM) signals.

FIG. 1A illustrates a fiber-optic system including a conventional directly modulated laser whose optical output goes through an optical component and is then detected by the optical receiver Rx. The optical output of the laser is directly modulated by a current signal I(t) which contains the signal information. The light from the laser goes through the optical component, and the optical output of the component is denoted by $P_{OUT}(t)$. The photodiode current in the receiver is denoted by $I_{PD}(t)$.

The optical component is treated as a linear transmission element that is described by two parameters: optical attenuation a and delay T. The chromatic dispersion of the optical component results in the delay being a function of wavelength; that is, $\tau=\tau(\lambda)$. The combined effects of chromatic dispersion and laser chirp is to delay different parts of the input waveforms by different amounts, which results in an amplitude correction factor of $$\left[1 + \frac{\partial \tau}{\partial t}\right]^{-1}$$

that causes distortion of the input optical waveform. Consequently, the output of the optical component is given by the equation:

$$P_{OUT}(t) = \frac{\alpha P_{IN}(t - \tau(\lambda))}{\left[1 + \frac{\partial \tau}{\partial t}\right]} \quad \text{(Equation 1)}$$

as shown in FIG. 1A.

Dispersion Compensation Techniques

Several strategies are known to those skilled in the art to avoid or suppress such second-order distortions. One is to tune the wavelength of the laser to the zero-dispersion wavelength of the optical component. The CSO distortion that is generated by the dispersion of the optical component then becomes negligible.

However, sometimes it is not possible to tune the laser wavelength to the zero-dispersion wavelength of the optical component. For example, if the laser transmitters are used in a DWDM system, then the laser wavelengths are constrained to specific values defined by standard groups such as the ITU and cannot be arbitrarily tuned. An example is a DWDM system operating in the C-Band (1550 nm region) of conventional single-mode fiber, the zero-dispersion wavelength is near 1310 nm and therefore the laser wavelengths cannot be tuned to the zero-dispersion wavelength of the optical fiber. In this case, the dispersion of the optical component (the optical fiber in this instance) is unavoidably high.

In those systems where the dispersion of the optical component is high, other techniques to suppress second-order distortions are known to those skilled in the art. There are several inventions that describe laser predistortion circuits to compensate for the second-order distortions generated by dispersion.

Dispersion-Slope Compensation Techniques

There are cases where the optical components also have extremely high values of dispersion-slope. "Dispersion-slope" refers to the slope of the dispersion characteristic of the optical components when plotted as a function of the optical wavelength. For example, dispersion slopes as high as 150 ps/nm$^2$ have been measured in optical filters used in DWDM systems. In comparison, 20 km of conventional single-mode fiber has a dispersion slope at the zero-dispersion wavelength of less than 2 ps/nm$^2$.

That is, the dispersion-slope of some optical components can be as high as that of 1600 km of optical fiber. At these high values of dispersion slopes, second-order effects (modulation of fiber delay due to residual dispersion that arises from the second-order term in the power series expansion of the delay characteristic) generates significant CSO distortion that can degrade the performance of CATV systems that employ analog signals or quasi-analog signals such as QAM.

It has been found that the dispersion-slope-induced CSO distortion can be as severe in magnitude as the CSO generated by the dispersion of the optical components at high dispersion-slope values. That is, second-order distortions can be generated both by the dispersion and dispersion-slope of optical components. This disclosure is concerned with suppressing the distortions generated by the dispersion-slope of optical components.

Prior inventions that describe suppression of second-order distortions generated by the dispersion of the optical components do not apply to the suppression of CSO generated by the dispersion-slope of the optical components. There are other inventions, however, that deal with suppression of CSO distortions generated by the dispersion-slope of optical components. They are generally referred to as dispersion-slope compensation techniques.

These prior dispersion-slope compensation inventions generally involve adding another device (or fiber) after the laser transmitter that has a dispersion-slope opposite in sign and equal in magnitude to the dispersion-slope of the optical component whose distortions you are trying to suppress. These other inventions suffer from two major disadvantages compared to the instant disclosure: (1) They usually compensate for only one value of dispersion-slope. Therefore, the dispersion-slope compensation device has to be tailor-made for the optical component whose distortions you are trying to suppress. If the optical component is replaced then the compensation device also has to be replaced. (2) The dispersion-slope compensation device is usually expensive—often as expensive, or more expensive, than the optical component whose distortion one is trying to suppress.

The present disclosure overcomes these limitations of previous inventions by performing dispersion-slope compensation using electronic compensation circuitry rather than using optical devices that have a dispersion slope opposite in sign to the component whose dispersion-slope one is trying to compensate. The compensation circuitry is also sometimes referred to as predistortion circuitry, but this must not be construed as limiting the location of this circuitry to a point prior to the optical source, such as in the optical transmitter. Since the generation of CSO distortion due to the dispersion and dispersion-slope of optical components is a linear process, the compensation circuitry can be placed anywhere in the optical network—either in the optical transmitter prior to the light source or in the optical receiver after the optical photodiode.

The cost of the electronic compensation circuitry describe in this disclosure is negligible since the technique adds a few inexpensive electronic parts to the existing optical transmitter or receiver. Furthermore, the compensation circuitry of this disclosure can compensate for the distortion generated by any value of dispersion-slope, and could even be made adaptive so that the technique remains effective even if the dispersion-slope of the optical component changes over time—and is therefore superior to prior inventions.

SUMMARY

There is a need for the following embodiments of the disclosure. Of course, the disclosure is not limited to these embodiments.

According to an embodiment of the disclosure, a process comprises: modulating the drive current of a laser via a direct path including a delay line and a parallel secondary path including a squarer, differentiator, and an amplifier that provides a gain proportional to the dispersion-slope of an optical component.

According to another embodiment of the disclosure, laser drive circuitry includes a direct path containing a delay line, a first parallel path including a squarer, differentiator, delay line, and an amplifier that provides a gain proportional to the dispersion of a first optical component, and a second parallel path including a squarer, differentiator, and an amplifier that provides a gain proportional to the dispersion-slope of a second optical component. This embodiment provides for the simultaneous, and independent, compensation for CSO distortion generated by the dispersion of one optical component and also for the CSO distortion generated by the dispersion-slope of a second optical component.

In another embodiment of this disclosure, the compensation circuitry is placed after the optical receiver. In this embodiment of the disclosure, the photodiode current output of the optical receiver is split into a direct path including a delay line and a parallel secondary path including a squarer, differentiator, and an amplifier that provides a gain proportional to the dispersion-slope of an optical component.

In other embodiments of this disclosure, the amplifier in the secondary path, whose gain is nominally set to a value proportional to the dispersion-slope of the optical component, is replaced by a voltage-controlled-amplifier whose gain can be adjusted by an error voltage. The error voltage is obtained by feeding a small part of the output of the optical component to a photodiode and then using a band-pass filter that is tuned to a frequency where there is an unwanted second-order distortion present. In this manner, this embodiment of the disclosure uses adaptive predistortion to automatically adjust the amplifier gain to obtain the best degree of CSO suppression even if the dispersion properties of the optical component changes with time.

These, and other, embodiments of the disclosure will be better appreciated and understood when considered in conjunction with the following description and the accompanying drawings. It should be understood, however, that the following description, while indicating various embodiments of the disclosure and numerous specific details thereof, is given for the purpose of illustration and does not imply limitation. Many substitutions, modifications, additions and/or rearrangements may be made within the scope of an embodiment of the disclosure without departing from the spirit thereof, and embodiments of the disclosure include all such substitutions, modifications, additions and/or rearrangements.

DESCRIPTION OF PREFERRED EMBODIMENTS

Embodiments of the disclosure and the various features and advantageous details thereof are explained more fully with reference to the non-limiting embodiments that are illustrated in the accompanying drawings and detailed in the following description. Descriptions of well known starting materials, processing techniques, components and equipment are omitted so as not to unnecessarily obscure the embodiments of the disclosure in detail. It should be understood, however, that the detailed description and the specific examples, while indicating preferred embodiments of the disclosure, are given by way of illustration only and not by way of limitation.

The below-referenced U.S. patent applications disclose embodiments that are useful for the purposes for which they are intended. The entire contents of Patent Cooperation Treaty Publication WO/2002/089363 are hereby expressly incorporated by reference herein for all purposes. The entire contents of U.S. Pat. App. Pub. 2009/0196629 are hereby expressly incorporated by reference herein for all purposes.

Embodiments of the instant disclosure relate generally to the field of transport of CATV and digital signals over an optical network. More particularly, an embodiment of this disclosure relates to transport of CATV and digital signals over optical components, both passive (optical filters, optical fiber, etc.) and active (optical amplifiers, EDFAs, Raman amplifiers, etc.), that exhibit high dispersion-slopes and thereby generate significant levels of second-order distortion. The CSO distortion at the output of the receiver generated by the dispersion-slope of the optical component can be cancelled using compensation circuitry including a parallel combination of the input signal I(t) and a secondary path where a predistortion signal $I_{predis}(t)$ is generated described by the equation:

$$I_{predis} = G_{opt} \frac{d(I^2)}{dt} \quad \text{(Equation 2)}$$

where $G_{opt}$ is a parameter independent of I(t) and is proportional to the dispersion slope $S_{opt}$ of the optical component (e.g. optical filter) and is given by the equation:

$$G_{opt} = \left(\frac{P_0 S_{opt}}{S_{las}}\right)\left(\frac{\lambda^4}{2c^2}\right)\eta_{FM}^2 \quad \text{(Equation 3)}$$

In equation (3), $\lambda$ denotes the wavelength of the optical signal, c denotes the speed of light in a vacuum, $\eta_{FM}$ denotes the laser chirp (also known as the laser FM efficiency) in units of MHz/mA, $P_0$ is the average power output of the laser in mW, $S_{las}$ denotes the slope of the laser light-current characteristic in units of mW/mA, and $S_{opt}$ denotes the dispersion-slope of the optical component in units of $ps/nm^2$ at wavelength $\lambda$. The compensation circuitry is typically incorporated into the optical transmitter, but it can also be incorporated into the optical receiver circuitry, if desired.

Figure 1A:
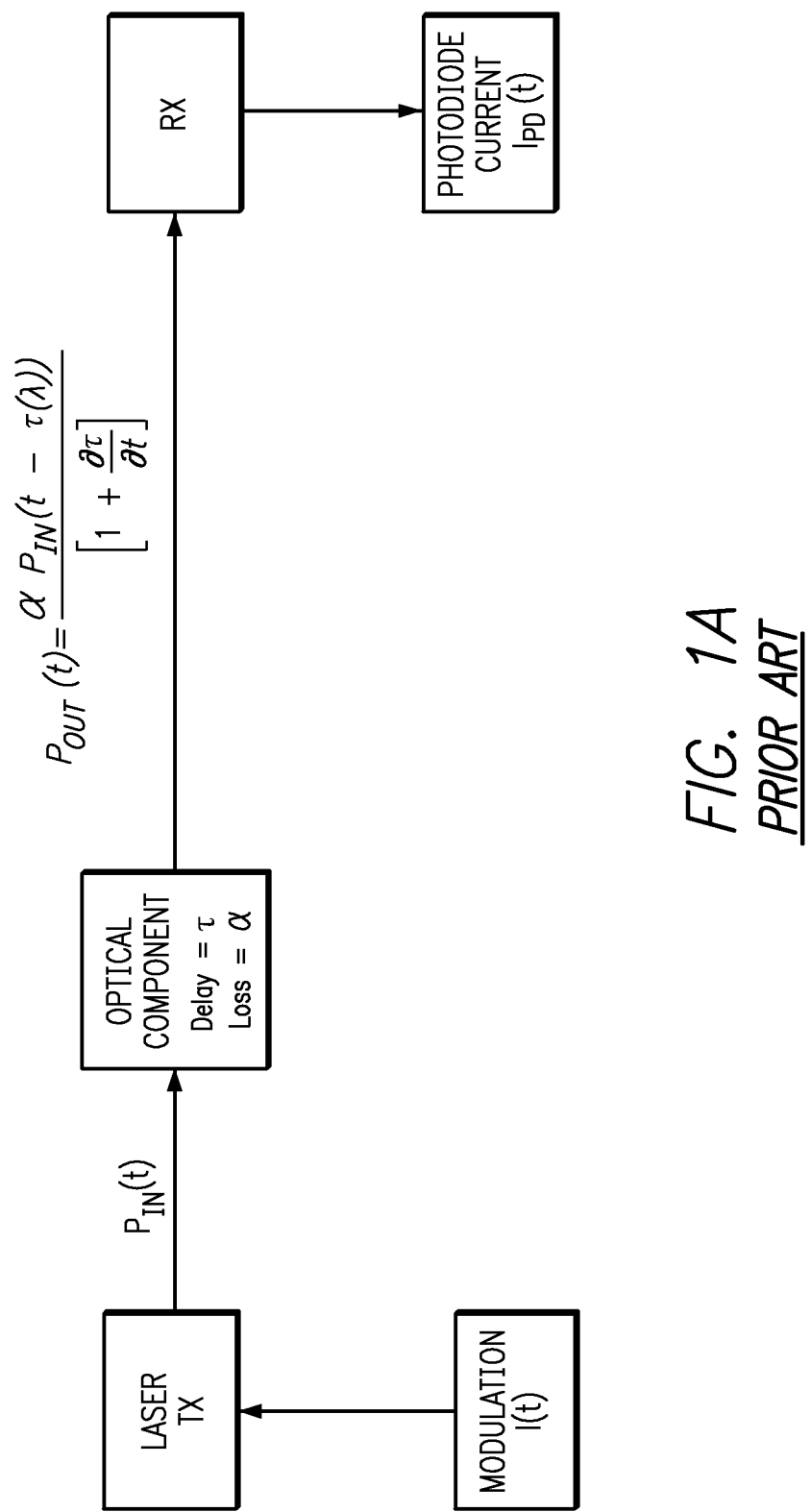
FIG. 1A illustrates a fiber-optic system including a conventional directly modulated laser Tx whose optical output goes through an optical component and is then detected by an optical receiver Rx, appropriately labeled prior art.
Figure 1B:
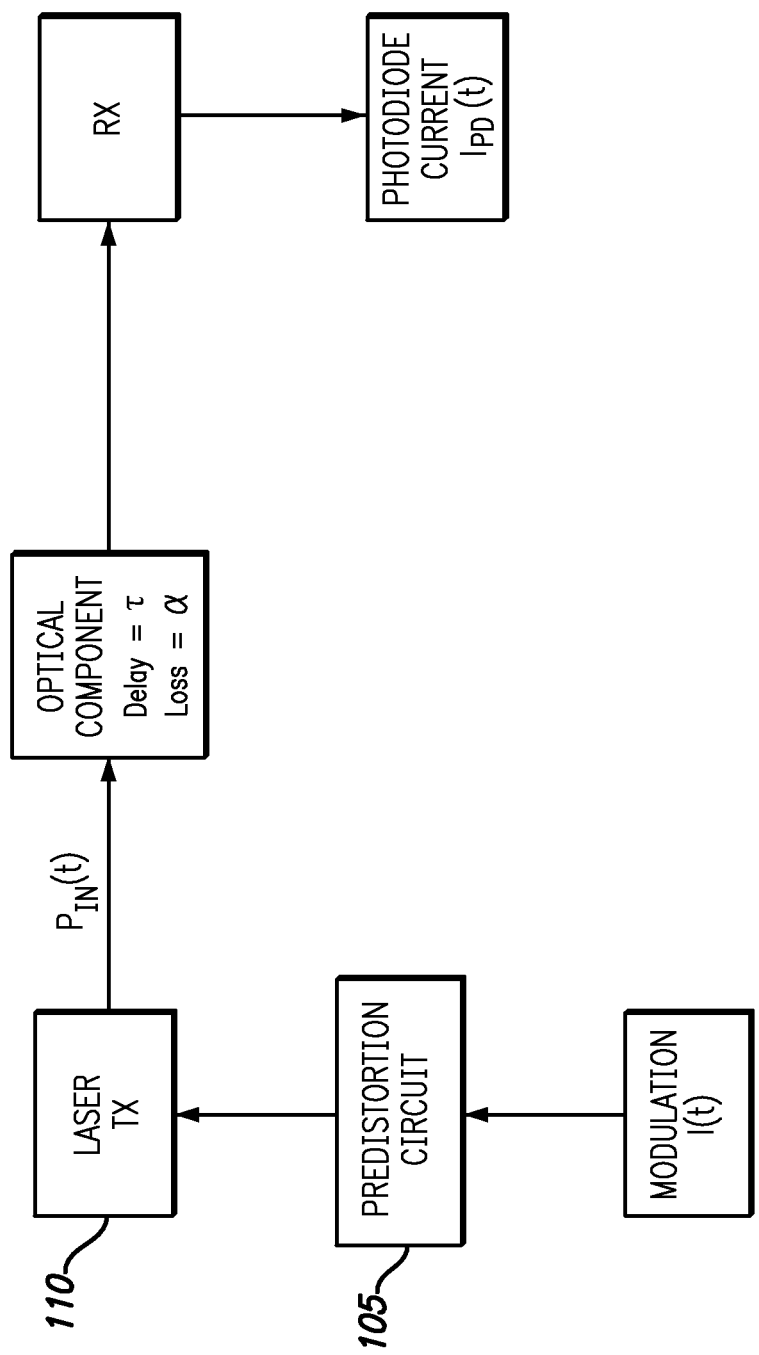
FIG. 1B is a schematic diagram of a fiber-optic system including predistortion circuitry in an optical transmitter.
Figure 1C:
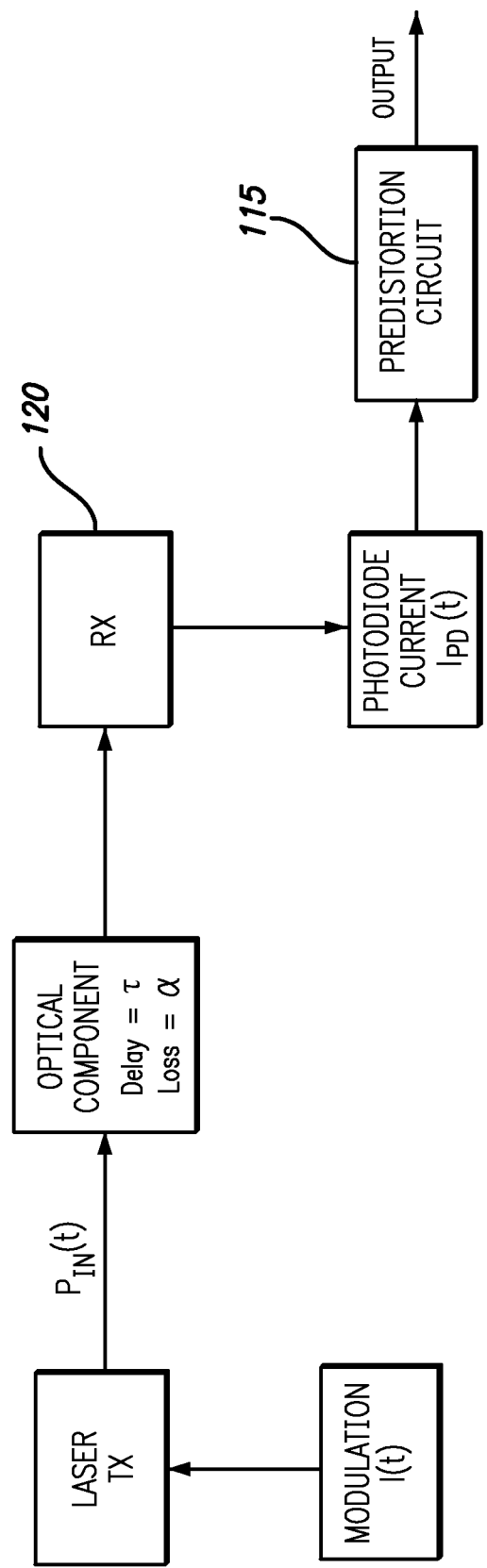
FIG. 1C is a schematic diagram of a fiber-optic system including compensation circuitry in an optical receiver.
Figure 2:
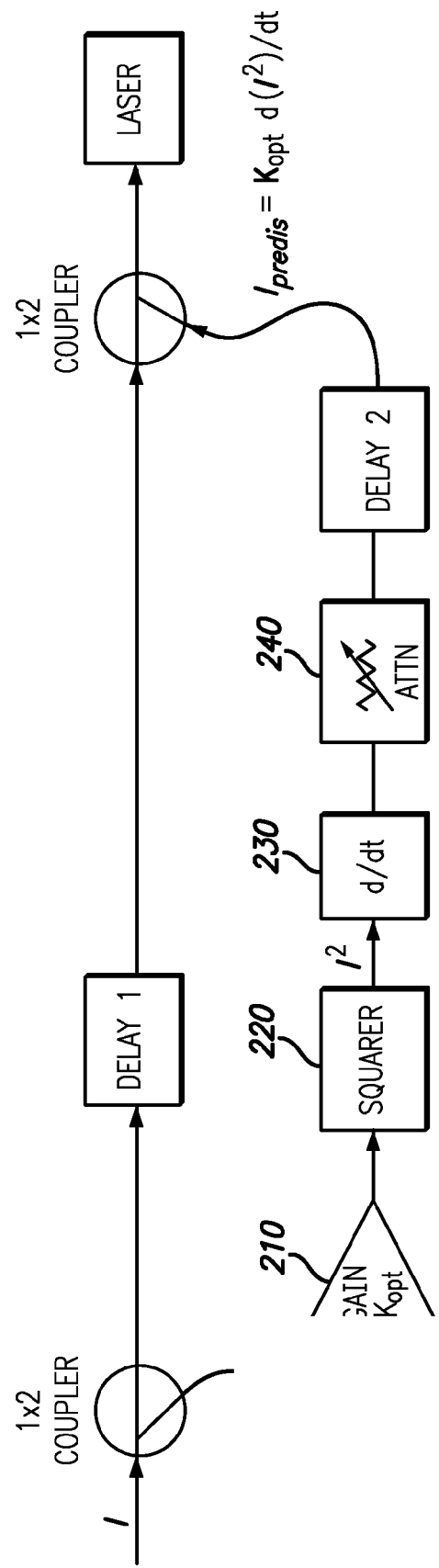
FIG. 2 is an embodiment of the disclosure illustrating a predistortion circuit that compensates for the CSO distortion generated by the dispersion-slope of an optical component.

In summary, compensation of the distortions is performed by generation of a predistortion current that is applied in parallel with the input signal current I(t). This predistortion current is advantageously proportional to the time derivative of the square of the signal current I(t) and is advantageously amplified by an amplifier with a current gain that is proportional to the dispersion-slope $S_{opt}$ of the optical component. FIG. 1B shows a fiber-optic system including predistortion circuitry 105 in (or coupled to) the optical transmitter 110. FIG. 1C shows a fiber-optic system including (predistortion) compensation circuitry 115 in (or coupled to) the optical receiver 120. An embodiment of this disclosure that performs the required operations is shown in FIG. 2.

EXAMPLES

Specific exemplary embodiments will now be further described by the following, nonlimiting examples which will serve to illustrate in some detail various features. The following examples are included to facilitate an understanding of ways in which embodiments of the present disclosure may be practiced. However, it should be appreciated that many changes can be made in the exemplary embodiments which are disclosed while still obtaining like or similar result without departing from the scope of embodiments of the present disclosure. Accordingly, the examples should not be construed as limiting the scope of the present disclosure.

Example 1

Laser Predistortion Circuit for Dispersion-Slope Compensation

FIG. 2 is an example of the disclosure that demonstrates a laser predistortion circuit including the signal path I(t) (the top path) and a predistortion path (bottom path). The predistortion path has greater electrical delay than the signal path since several operations (squaring, differentiating) are advantageously performed in this path. Therefore, a delay line (labeled "Delay 1") is placed in the signal (top) path to ensure that both paths have the same delay. Delay lines are easily implemented; for example, it could be as simple as a length of coaxial cable and embodiments of this disclosure are not limited to specific implementations.

In the predistortion (bottom) path, the box labeled "Squarer" 220 squares the input current signal and the box labeled "d/dt" 230 differentiates the input signal. There are a multitude of circuits that perform these functions; the particular circuit implementation chosen will be a tradeoff between cost and performance—the most important of which is generation of the distortion terms while suppressing the (undesired) signal I and embodiments of this disclosure are not limited to specific implementations.

An amplifier 210 (labeled "GAIN" in FIG. 2) provides the required gain for the predistortion path. The variable attenuator 240 (labeled "ATTN") is optional and can be implemented to ensure that the net gain due to the amplifier and attenuator is the gain $G_{opt}$ given by equation (3). The amplifier not only provides gain (or inverting gain if desired) but also provides isolation between the two paths. The variable attenuator is used to fine-tune for maximum suppression of the $2^{nd}$ order dispersion-slope-induced distortions. The delay line labeled "Delay 2" in the predistortion path is optional and could be implemented if it makes the task of equalizing the delay in the two paths easier.

The gain of the amplifier 210 would be set to the required value of $G_{opt}$ specified by equation (3) through software (such as a graphical user interface) in one of several ways: (1) the gain could be pre-programmed to a set value, (2) the gain could be manually entered by the user, or (3) the user could enter the model number of the optical component and the software would choose the required gain by using a lookup table.

Example 2

Adaptive Laser Predistortion Circuit for Dispersion-Slope Compensation

Figure 3:
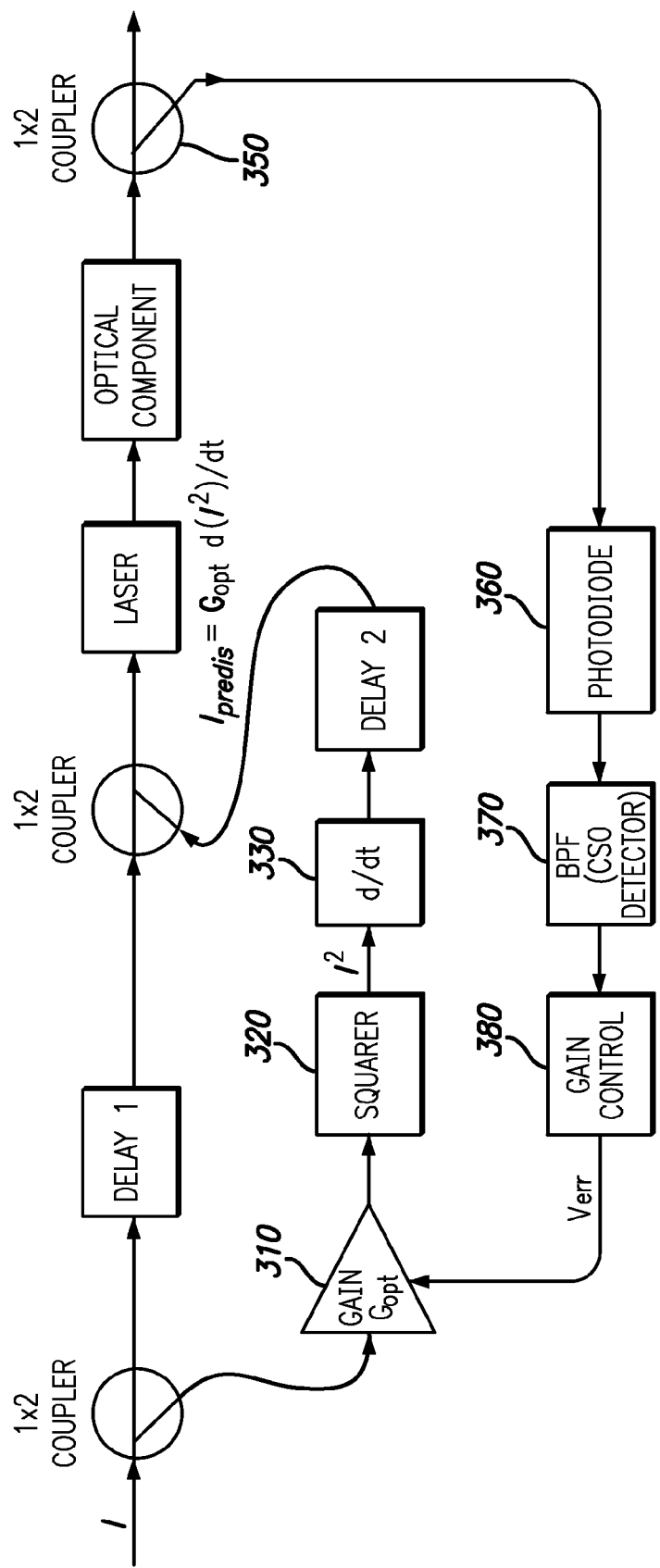
FIG. 3 is another embodiment of the disclosure where an adaptive predistortion path is added to the predistortion circuit that fine-tunes the gain of a voltage-controlled amplifier so that maximum suppression of CSO distortion is automatically obtained, even if laser or optical component parameters change with time.

Another example of the disclosure that incorporates adaptive predistortion is shown in FIG. 3. It is similar to the previous example in that there is a direct path for the current signal (top path in FIG. 3) and a predistortion path (middle path in FIG. 3) that generates the predistortion current $I_{predis}$ using a squarer 320, differentiator 330, an RF amplifier 310 and an RF attenuator (not shown in FIG. 3). Rather than having to fine-tune an attenuator in order to obtain the maximum suppression of the $2^{nd}$ order dispersion-slope-induced distortions as in the previous example, this example uses adaptive predistortion to automatically adjust the amplifier 310 gain to obtain the best degree of CSO suppression. This is done by using a voltage-controlled-amplifier (labeled "GAIN" in FIG. 3) whose gain can be adjusted by an error voltage (labeled $V_{err}$ in FIG. 3).

A 1×2 coupler 350 is placed after the optical component whose distortions we are trying to suppress. A small part of the output of the optical component is fed to a photodiode 360 and then a band-pass filter 370 (labeled "BPF" in the lowest path in FIG. 3). The band-pass filter is tuned to a frequency where there is an unwanted second-order distortion present. For example, in a 1 GHz CATV system, if there is a signal present at 550 MHz, then any output at 1100 MHz would represent an unwanted second-order distortion and hence the BPF would be tuned to 1100 MHz. A gain control circuit 380 ("Gain Control" in FIG. 3) would amplify the output of the band-pass filter to yield the error voltage $V_{err}$.

The gain of the amplifier (labeled "Gain" in FIG. 3) is set to the nominal value of $G_{opt}$ given by equation (3). The gain of the amplifier is varied by the voltage $V_{err}$ in such a fashion as to minimize the error voltage $V_{err}$. There are many designs for voltage-controlled-amplifiers that are controlled by an error voltage $V_{err}$ where the gain is varied such as to minimize $V_{err}$. Minimizing the error voltage also results in minimization of the second-order distortions and embodiments of this disclosure are not limited to specific designs.

Example 3

Figure 4:
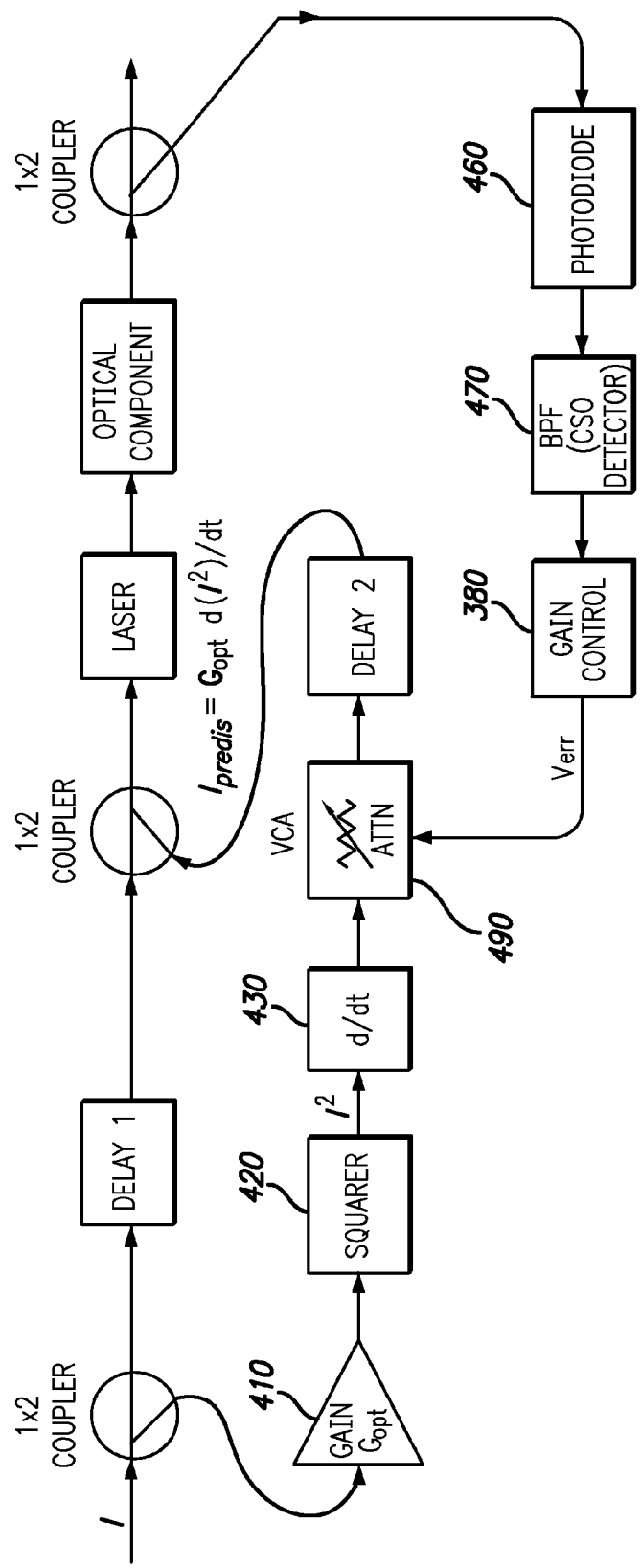
FIG. 4 is another embodiment of the disclosure where an adaptive predistortion path is added to the predistortion circuit that fine-tunes the gain of a voltage-controlled attenuator so that maximum suppression of CSO distortion is automatically obtained, even if laser or optical component parameters change with time.

Another example of the adaptive predistortion technique where a voltage-controlled-attenuator is used rather than a voltage-controlled amplifier is shown in FIG. 4. As in the example shown in FIG. 3, an error voltage $V_{err}$ is derived by sampling a portion of the output of the optical component, detecting with a photodiode 460 and filtering with a band-pass filter 470 tuned to a frequency where there is an unwanted second-order distortion. In this example, however, the error voltage $V_{err}$ is used to control a voltage-controlled RF attenuator 490 (labeled "VCA" in FIG. 4). The gain of the amplifier 410 (labeled "Gain" in FIG. 4) is set to the nominal value of $G_{opt}$ given by equation (3). The attenuation of ATTN is varied by the voltage $V_{err}$ in such a fashion as to minimize the error voltage $V_{err}$. The predistortion paths include of a squarer 420, a differentiator 430, the RF amplifier 410 and the voltage-controlled RF attenuator 490.

The advantage of the examples described above that utilize adaptive predistortion is that optimum suppression of dispersion-slope induced CSO distortion is maintained even if the dispersion-slope of the optical component changes with time or laser parameters (such as the slope $S_{ias}$ of the laser light-current characteristic) degrades with time. This ensures long-term stability of the predistortion technique. Another benefit of using adaptive predistortion is that lookup tables containing the properties of different models of optical components are no longer needed—the same predistortion circuit provides optimum CSO suppression for different models of optical components that may have different dispersion-slope values.

Example 4

Pre-Distortion Circuitry for Simultaneous and Independent Compensation of CSO Generated by Dispersion-Slope and Dispersion CSO distortions can also be generated by the dispersion of optical components as well as the dispersion slope of such components. There are many known techniques for compensating for the CSO distortion generated by the dispersion of optical components, including laser predistortion techniques. Therefore, laser predistortion techniques are known that can be used to compensate for CSO distortions generated by the dispersion of an optical component while the present disclosure describes a laser predistortion technique that compensates for CSO distortions generated by the dispersion-slope of an optical component.

It might seem that the two predistortion circuits could be simultaneously utilized in order to compensate for both the dispersion of one optical component and the dispersion-slope of a second optical component. (This does not preclude the case where the second optical component is the same as the first optical component.) This, however, is generally not the case. This is because the principle of superposition does not apply due to the inherent nonlinearity of these circuits—the d/dt function is a linear function but the "squarer" is not linear circuits (since it generates a current proportional to $I^2$). Thus using two compensation circuits, each of which compensate for one type of distortion, may end up not compensating for either type of distortion when combined. That is, the simultaneous use of both predistortion circuitry would, in general, generate additional distortion terms that would degrade the effectiveness of both predistortion compensation techniques or make it impossible to independently compensate for each distortion mechanism.

Figure 5:
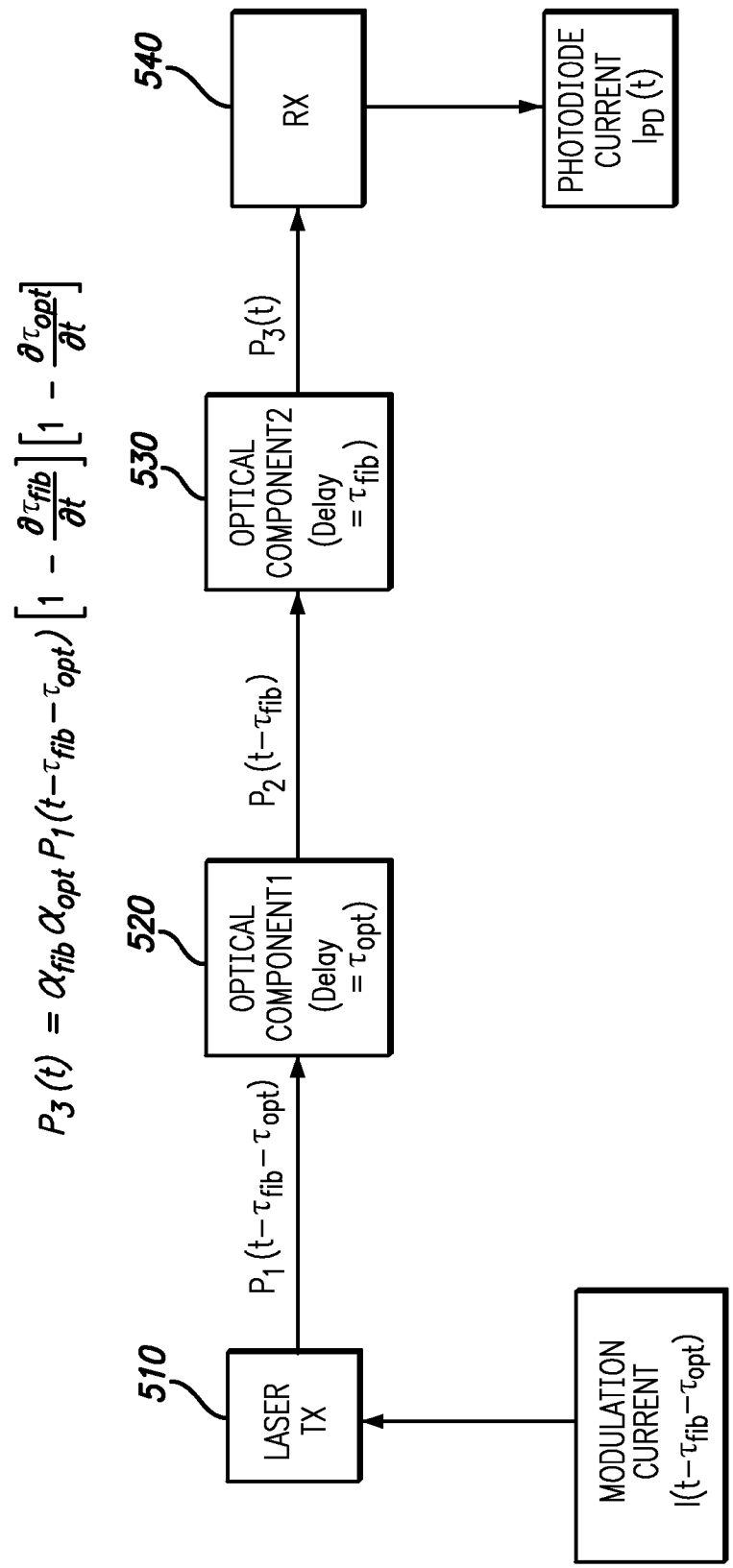
FIG. 5 shows the model of a system comprised of a laser, a first optical component that generates CSO distortion due to its dispersion-slope, and a second optical component that generates additional CSO distortion due to its dispersion.

FIG. 5 shows a model relating the laser modulation current I(t), the optical waveforms at the output of the laser 510 ($P_1$), the output of a first optical component 520 ($P_2$), and the output of a second optical component 530 ($P_3$). It is assumed that second-order distortions are generated by the dispersion-slope $S_{opt}$ of the first optical component and by the dispersion D of the second optical component. For example, the second optical component could be a length of fiber, in which case D would represent the total fiber dispersion in units of ps/nm.

An analysis of the system described in FIG. 5 shows that the output power $P_3$ of the second optical component is given by the equation:

$$P_3(t) = \alpha_{fib}\alpha_{opt}P_1(t - \tau_{fib} - \tau_{opt})\left[1 - \frac{\partial \tau_{fib}}{\partial t}\right]\left[1 - \frac{\partial \tau_{opt}}{\partial t}\right] \quad \text{(Equation 4)}$$

where $\alpha_{opt}$ and $\alpha_{fib}$ represent the optical loss of the first and second optical component, respectively, and $\tau_{opt}$, $\tau_{fib}$, represent the delay of the first and second optical component, respectively.

From this, further analysis shows that the CSO distortion at the output of the receiver 540 generated by the combination of the dispersion-slope of the first optical component and the dispersion of the second optical component is cancelled if the laser is modulated by a parallel combination of I(t) and a predistortion current $I_{predis}$ (t) given by:

$$I_{predis} = [G_{fib} + G_{opt}]\frac{d(I^2)}{dt} \quad \text{(Equation 5)}$$

where $$G_{fib} = -DL\left(\frac{\lambda^2}{c}\right)\eta_{FM} \quad \text{(Equation 6)}$$

$$G_{opt} = \left(\frac{P_0 S_0}{S_1}\right)\left(\frac{\lambda^4}{2c^2}\right)\eta_{FM}^2 \quad \text{(Equation 7)}$$

are the amplification factors required for the two types of predistortion (dispersion-slope of the first optical component and dispersion of the second optical component). The fact that $G_{fib}$ depends only on the dispersion D of the second component and not the dispersion-slope of the first component, while $G_{opt}$ depends only on the dispersion-slope of the first optical component (and not on the dispersion of the second component) means that the dispersion compensation and dispersion-slope compensation can be performed simultaneously and independently.

Figure 6:
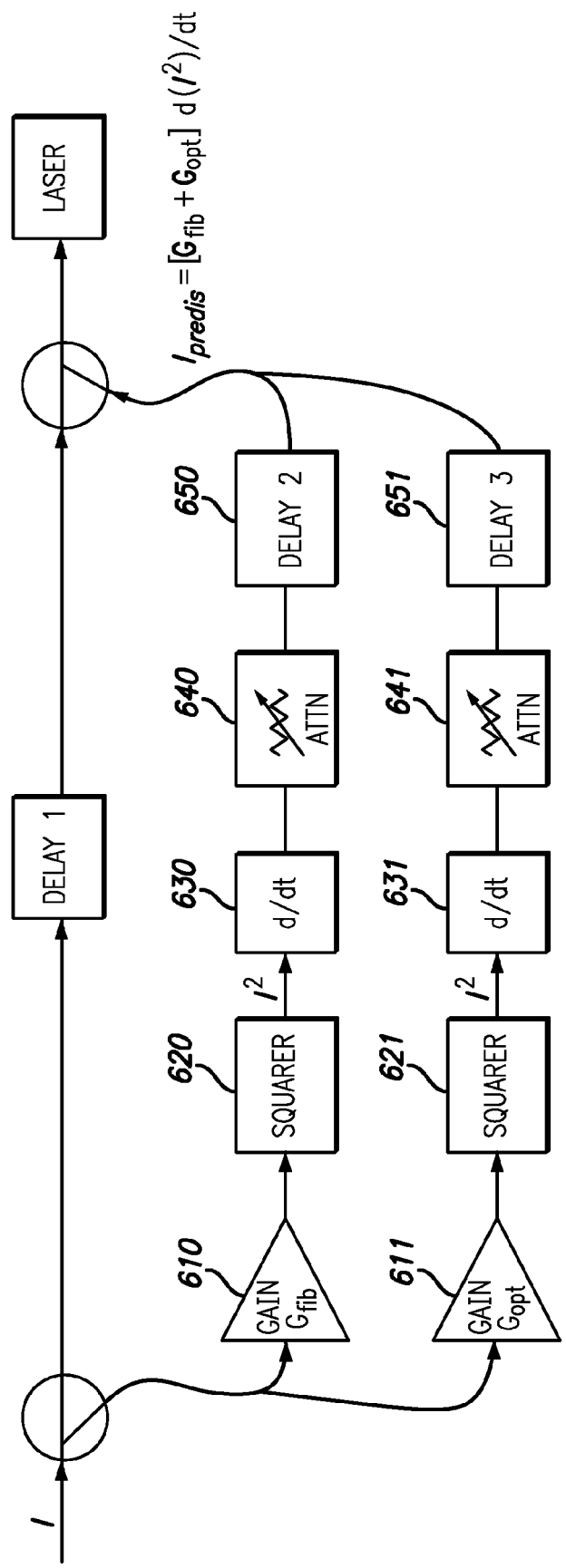
FIG. 6 is an embodiment of the disclosure that provides simultaneous, and independent, compensation of both dispersion-slope induced CSO distortion of a first optical component and dispersion-induced CSO distortion of a second optical component using two predistortion paths.

FIG. 6 shows an example of the disclosure that provides for the simultaneous, and independent, compensation of second-order distortions generated by both the dispersion-slope of a first optical component and the dispersion of a second optical component. It includes of a signal path (top path) and two predistortion paths (bottom paths) for dispersion-slope compensation of a first optical component (bottom path) and dispersion compensation of a second optical component (middle path), respectively. Each of the predistortion paths include of a squarer 620, 621, differentiator 630, 631, an RF amplifier 610, 611 and an RF attenuator 640, 641.

Each path has a simple delay line 650, 651 in order to equalize the delays of the three paths. The predistortion path for dispersion-slope compensation of a first optical component (bottom path) has a gain $G_{opt}$ (given by equation 7) that is positive and proportional to the dispersion-slope of the first optical component. The predistortion path for dispersion compensation of a second optical component (middle path) has a gain $G_{fib}$ (given by equation 6) that is negative and proportional to the dispersion of the second optical component. The required electrical gains are achieved through the use of an amplifier and attenuator in each of the two predistortion paths.

Note that the gain of the two predistortion paths are the negative of each other, reflecting the fact that the CSO distortions due to dispersion and dispersion-slope are out of phase of each other.

Example 5

Figure 7:
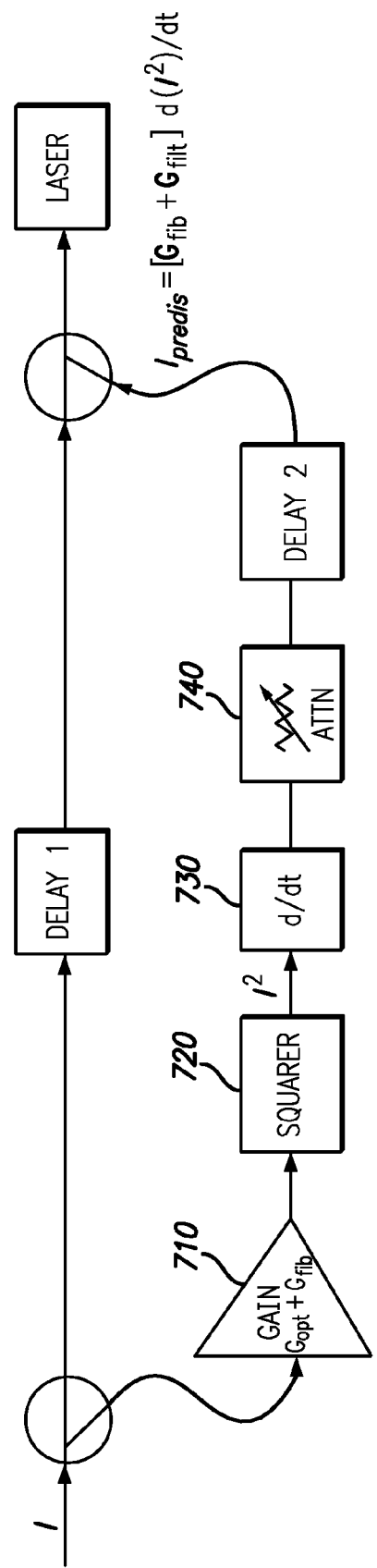
FIG. 7 is an embodiment of the disclosure that provides simultaneous, and independent, compensation of both dispersion-slope induced CSO distortion of a first optical component and dispersion-induced CSO distortion of a second optical component using a single predistortion path.

FIG. 7 shows another example of the disclosure that also provides for the simultaneous, and independent, compensation of second-order distortions generated by both the dispersion-slope of a first optical component and the dispersion of a second optical component. In this example, the two predistortion paths of the previous example have been combined into a single predistortion path. The predistortion path includes a squarer 720, differentiator 730, an RF amplifier 710 and an RE attenuator 740. The gain of the RF amplifier is now ($G_{opt}+G_{fib}$) where $G_{opt}$ is proportional to the dispersion-slope of the first optical component, and $G_{fib}$ is proportional to the dispersion of the second optical component. This eliminates the need for one of the delay lines and simplifies the predistortion circuitry while still providing for the simultaneous, and independent, compensation of dispersion and dispersion-slope.

Example 6

Other Equivalent Methods of Generating the Predistortion Currents

The predistortion paths in all examples mentioned so far have employed a squarer and differentiator to realize a predistortion current proportional to $d(I^2)/dt$. There are many other equivalent methods of realizing a predistortion current proportional to $d(I^2)/dt$. For example, using the identity $d(I^2)/dt=2I(dI/dt)$, it is seen that $d(I^2)/dt$ can be realized by a differentiator and multiplier circuit (rather than a differentiator and squarer) as illustrated in the example of the disclosure shown in FIG. 8, as long as the gain of the amplifier is doubled.

In this example, the predistortion path (lower path) includes of an amplifier 810, a differentiator 830, a multiplier circuit 835, an attenuator 840 and an optional delay line 850. The modulated current signal I(t) is tapped off from the top path and multiplied with dI/dt at the multiplier circuit. This is equivalent to the use of squarer and differentiator circuits. Many other circuit combinations are capable of generating the required predistortion current proportional to $d(I^2)/dt$ and the embodiment of this disclosure are not limited to specific circuit combinations.

Example 7

Adaptive Compensation Circuitry in Optical Receiver for Simultaneous and Independent Compensation of CSO Generated by Dispersion-Slope and Dispersion The compensation circuitry in all examples mentioned so far have employed the circuitry in (or coupled to) the optical transmitter. Since the generation of CSO distortion due to the dispersion and dispersion-slope of optical components is a linear process, the compensation circuitry can be placed anywhere in the optical network—either in the optical transmitter prior to the light source or in the optical receiver after the optical photodiode.

Figure 9:
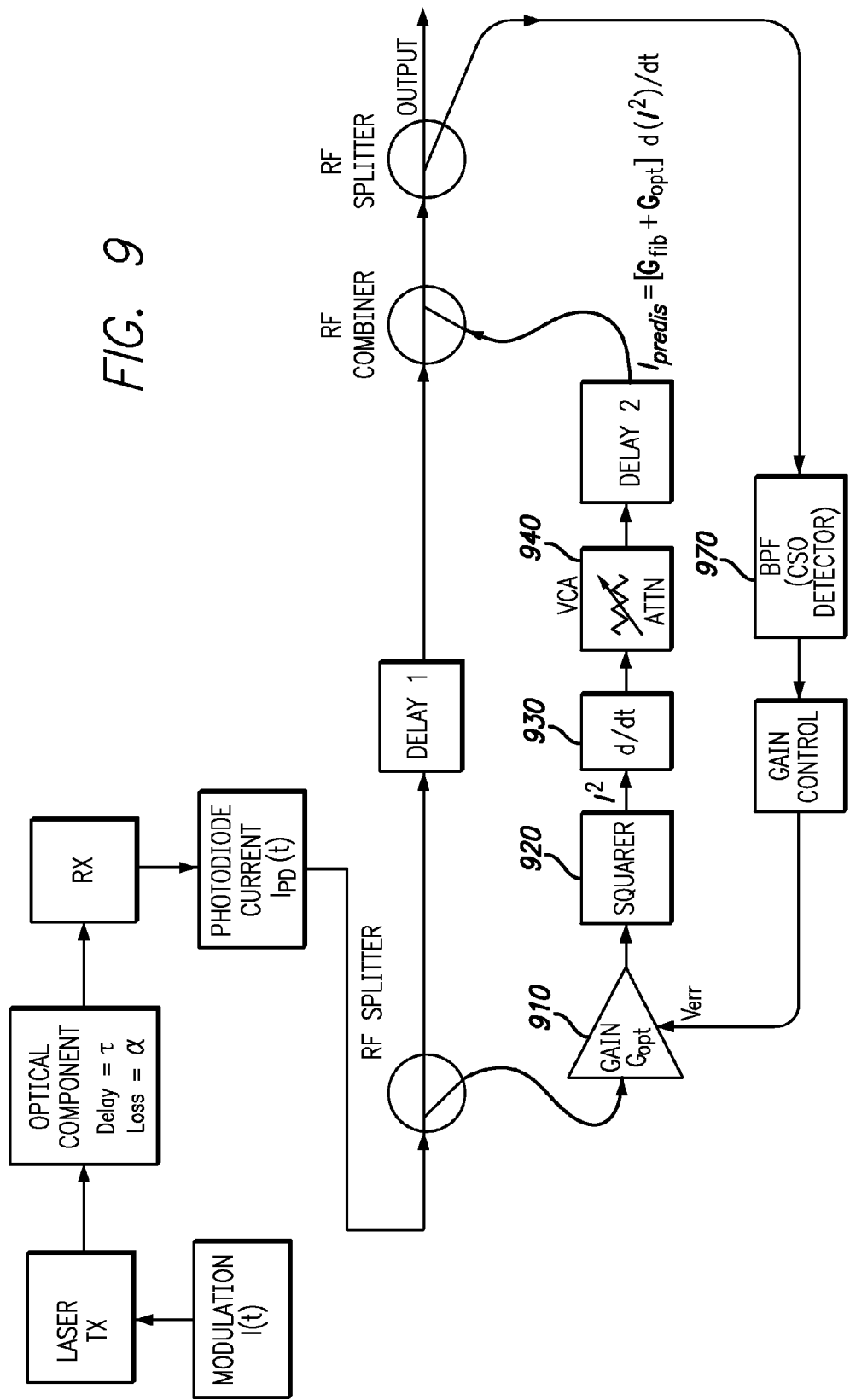
FIG. 9 is an embodiment of the disclosure that provides simultaneous, and independent, compensation of both dispersion-slope induced CSO distortion of a first optical component and dispersion-induced CSO distortion of a second optical component using compensation circuitry located in the optical receiver.

FIG. 9 shows an example of the disclosure that provides for the simultaneous, and independent, compensation of second-order distortions generated by both the dispersion-slope of a first optical component and the dispersion of a second optical component. In this example, the two-fold compensation circuitry is located in (or coupled to) the optical receiver, rather than in the optical transmitter. The compensation circuitry includes of a primary direct path and a secondary path including a squarer 920, differentiator 930, an RF amplifier 910 and an RF attenuator 940. The gain of the RF amplifier is ($G_{opt}+G_{fib}$) where $G_{opt}$ is proportional to the dispersion-slope of a first optical component, and $G_{fib}$ is proportional to the dispersion of a second optical component.

In order to obtain adaptive compensation, a portion of the output of the compensation circuitry is fed to a band-pass filter 970 (labeled "BPF" in the lowest path in FIG. 9). The band-pass filter is tuned to a frequency where there is an unwanted second-order distortion present. For example, in a 1 GHz CATV system, if there is a signal present at 550 MHz, then any output at 1100 MHz would represent an unwanted second-order distortion and hence the BPF would be tuned to 1100 MHz. A gain control circuit ("Gain Control" in FIG. 9) would amplify the output of the band-pass filter to yield the error voltage $V_{err}$.

The gain of the amplifier (labeled "Gain" in FIG. 9) is set to the nominal value of $(G_{opt}+G_{opt})$ given by equations (6) and (7). The gain of the amplifier is varied by the voltage $V_{err}$ in such a fashion as to minimize the error voltage $V_{err}$. There are many designs for voltage-controlled-amplifiers that are controlled by an error voltage $V_{err}$ where the gain is varied such as to minimize $V_{err}$ and the embodiments of this disclosure are not limited to specific designs. Minimizing the error voltage also results in minimization of the second-order distortions.

CONCLUSION

Embodiments of this disclosure can include {1} a distortion compensation circuit for compensation of the distortion generated by the dispersion-slope of an optical component and the frequency chirp of an optical transmitter, where the distortion compensating circuit is incorporated into the optical transmitter, the optical receiver, or at some intermediate point in a fiber-optic network; the distortion compensation circuit comprising: a primary electrical signal path that receives at least a portion of the input signal and, optionally, a delay line; and a secondary signal path in parallel to the primary path that receives at least a portion of the input signal and including (not necessarily in this order) of: an amplifier with an electrical current gain that is proportional to the dispersion-slope of the optical component, an optional RE attenuator, an optional delay line, a "squarer" circuit whose output is the square of the input signal, and a "differentiator" circuit whose output is the derivative of the input signal (as shown in FIG. 2).

Figure 8:
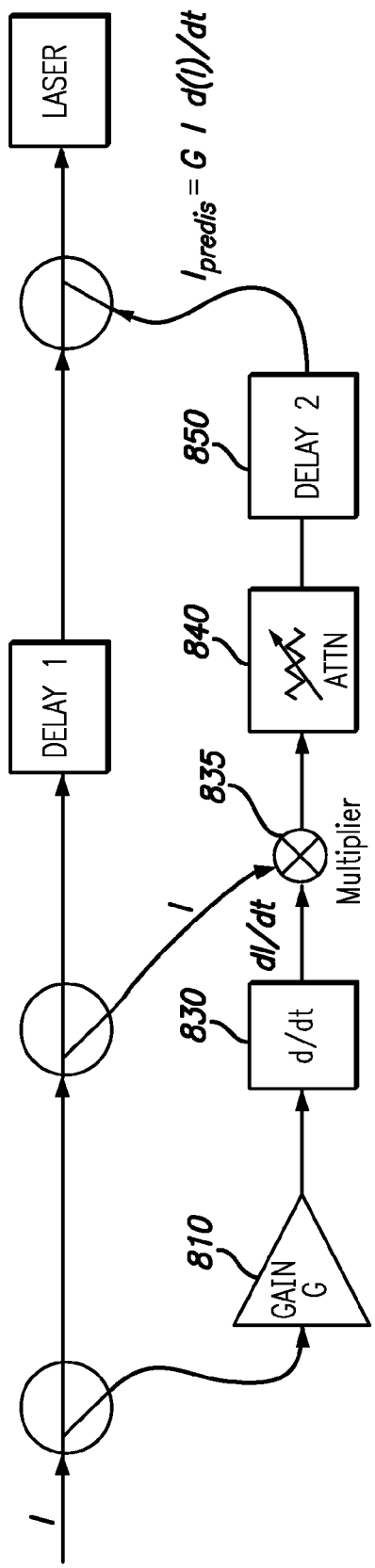
FIG. 8 shows a different method of obtaining the predistortion current $d(I^2)/dt$ using a differentiator and a multiplier circuit rather than a squarer and differentiator.

Embodiments of this disclosure can include the distortion compensation circuit {1} (i.e. the sub-generic embodiment described by the preceding paragraph and identified by the tag "{1}") wherein the "squarer" circuit in the secondary signal path is replaced by an equivalent "multiplier" circuit that multiplies a portion of the input signal (I) with its derivative dI/dt (as shown in FIG. 8).

Embodiments of this disclosure can include the distortion compensation circuit {1} wherein the compensation circuitry has been made "adaptive" by replacing the amplifier in the secondary signal path with a voltage-controlled amplifier and the addition of a feedback path that receives at least a portion of the signal at some point past the optical component that exhibits the dispersion-slope; the feedback path comprising: an optional photodiode (in case the portion of the signal that is fed back is optical), a band-pass filter that is tuned to a frequency where there is an unwanted second-order distortion present, and a gain control circuit that amplifies the output of the band-pass filter to yield an error voltage that is used to control the gain of the voltage-controlled amplifier in the secondary signal path (as shown in FIG. 3).

Embodiments of this disclosure can include the distortion compensation circuit {1} wherein the compensation circuitry has been made "adaptive" by replacing the attenuator in the secondary path with a voltage-controlled attenuator and the addition of a feedback path that receives at least a portion of the signal at some point past the optical component that exhibits the dispersion-slope; the feedback path comprising: an optional photodiode (in case the portion of the signal that is fed back is optical), a band-pass filter that is tuned to a frequency where there is an unwanted second-order distortion present, and a gain control circuit that amplifies the output of the band-pass filter to yield an error voltage that is used to control the attenuation of the voltage-controlled attenuator in the secondary path (as shown in FIG. 4).

Embodiments of this disclosure can include {5} a distortion compensation circuit for simultaneous, and independent, compensation of second-order distortions generated by both the dispersion-slope of a first optical component and the dispersion of a second optical component, where the distortion compensating circuit is incorporated into the optical transmitter, the optical receiver, or at some intermediate point in a fiber-optic network; the distortion compensation circuit comprising: a primary electrical signal path that receives at least a portion of the input signal and, optionally, a delay line; and a secondary signal path in parallel to the primary path that receives at least a portion of the input signal and including (not necessarily in this order) of: an amplifier with an electrical current gain that is proportional to the dispersion-slope of the first optical component, an optional RF attenuator, an optional delay line, a "squarer" circuit whose output is the square of the input signal, and a "differentiator" circuit whose output is the derivative of the input signal; and a third signal path in parallel to the primary and secondary paths that receives at least a portion of the input signal and including (not necessarily in this order) of: an amplifier with an electrical current gain that is proportional to the dispersion of the second optical component, an optional RF attenuator, an optional delay line, a "squarer" circuit whose output is the square of the input signal, and a "differentiator" circuit whose output is the derivative of the input signal (as shown in FIG. 6).

Embodiments of this disclosure can include the distortion compensation circuit {5} wherein the "squarer" circuits in the second and third signal paths are replaced by equivalent "multiplier" circuits that multiplies a portion of the input signal (I) with its derivative dI/dt.

Embodiments of this disclosure can include the distortion compensation circuit {5} wherein the compensation circuitry has been made "adaptive" by replacing the amplifiers in the second and third signal paths with voltage-controlled amplifiers and the addition of a feedback path that receives at least a portion of the signal at some point past the optical component that exhibits the dispersion-slope; the feedback path comprising: an optional photodiode (in case the portion of the signal that is fed back is optical), a band-pass filter that is tuned to a frequency where there is an unwanted second-order distortion present, and a gain control circuit that amplifies the output of the band-pass filter to yield an error voltage that is used to control the gains of the voltage-controlled amplifiers in the second and third signal paths.

Embodiments of this disclosure can include the distortion compensation circuit {5} wherein the compensation circuitry has been made "adaptive" by replacing the attenuators in the second and third signal paths with voltage-controlled attenuators and the addition of a feedback path that receives at least a portion of the signal at some point past the optical component that exhibits the dispersion-slope; the feedback path comprising: an optional photodiode (in case the portion of the signal that is fed back is optical), a band-pass filter that is tuned to a frequency where there is an unwanted second-order distortion present, and a gain control circuit that amplifies the output of the band-pass filter to yield an error voltage that is used to control the attenuations of the voltage-controlled attenuators in the second and third signal paths.

Embodiments of this disclosure can include a distortion compensation circuit {9} for simultaneous, and independent, compensation of second-order distortions generated by both the dispersion-slope of a first optical component and the dispersion of a second optical component, where the distortion compensating circuit is incorporated into the optical transmitter, the optical receiver, or at some intermediate point in a fiber-optic network; the distortion compensation circuit comprising: a primary electrical signal path that receives at least a portion of the input signal and, optionally, a delay line; and a secondary signal path in parallel to the primary path that receives at least a portion of the input signal and including (not necessarily in this order) of: an amplifier with an electrical current gain equal to $(G_1+G_2)$ where $G_1$ is proportional to the dispersion-slope of the first optical component, and $G_2$ is proportional to the dispersion of the second optical component, an optional RF attenuator, an optional delay line, a "squarer" circuit whose output is the square of the input signal, and a "differentiator" circuit whose output is the derivative of the input signal (as shown in FIG. 7).

Embodiments of this disclosure can include the distortion compensation circuit {9} wherein the "squarer" circuit in the secondary signal path is replaced by an equivalent "multiplier" circuit that multiplies a portion of the input signal (I) with its derivative dI/dt.

Embodiments of this disclosure can include the distortion compensation circuit {9} wherein the compensation circuitry has been made "adaptive" by replacing the amplifier in the secondary signal path with a voltage-controlled amplifier and the addition of a feedback path that receives at least a portion of the signal at some point past the optical component that exhibits the dispersion-slope; the feedback path comprising: an optional photodiode (in case the portion of the signal that is fed back is optical), a band-pass filter that is tuned to a frequency where there is an unwanted second-order distortion present, and a gain control circuit that amplifies the output of the band-pass filter to yield an error voltage that is used to control the gain of the voltage-controlled amplifier in the secondary signal path.

Embodiments of this disclosure can include the distortion compensation circuit {9} wherein the compensation circuitry has been made "adaptive" by replacing the attenuator in the secondary signal path with a voltage-controlled attenuator and the addition of a feedback path that receives at least a portion of the signal at some point past the optical component that exhibits the dispersion-slope; the feedback path comprising: an optional photodiode (in case the portion of the signal that is fed back is optical), a band-pass filter that is tuned to a frequency where there is an unwanted second-order distortion present, and a gain control circuit that amplifies the output of the band-pass filter to yield an error voltage that is used to control the attenuation of the voltage-controlled attenuator in the secondary signal path.

The terms program and software and/or the phrases program elements, computer program and computer software are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system). The phrase radio frequency (RF) is intended to mean frequencies less than or equal to approximately 300 GHz as well as the infrared spectrum. The term light is intended to mean frequencies greater than or equal to approximately 300 GHz as well as the microwave spectrum.

The term uniformly is intended to mean unvarying or deviate very little from a given and/or expected value (e.g, within 10% of). The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a and/or an are employed for grammatical style and merely for convenience.

The term plurality is intended to mean two or more than two. The term any is intended to mean all applicable members of a set or at least a subset of all applicable members of the set. The phrase any integer derivable therein is intended to mean an integer between the corresponding numbers recited in the specification. The phrase any range derivable therein is intended to mean any range within such corresponding numbers. The term means, when followed by the term "for" is intended to mean hardware, firmware and/or software for achieving a result. The term step, when followed by the term "for" is intended to mean a (sub)method, (sub)process and/or (sub)routine for achieving the recited result. Unless otherwise defined, all technical and scientific terms used herein have the same meaning as commonly understood by one of ordinary skill in the art to which this present disclosure belongs. In case of conflict, the present specification, including definitions, will control.

The described embodiments and examples are illustrative only and not intended to be limiting. Although embodiments of the present disclosure can be implemented separately, embodiments of the present disclosure may be integrated into the system(s) with which they are associated. All the embodiments of the present disclosure disclosed herein can be made and used without undue experimentation in light of the disclosure. Embodiments of the present disclosure are not limited by theoretical statements (if any) recited herein. The individual steps of embodiments of the present disclosure need not be performed in the disclosed manner, or combined in the disclosed sequences, but may be performed in any and all manner and/or combined in any and all sequences. The individual components of embodiments of the present disclosure need not be combined in the disclosed configurations, but could be combined in any and all configurations.

Various substitutions, modifications, additions and/or rearrangements of the features of embodiments of the present disclosure may be made without deviating from the scope of the underlying inventive concept. All the disclosed elements and features of each disclosed embodiment can be combined with, or substituted for, the disclosed elements and features of every other disclosed embodiment except where such elements or features are mutually exclusive. The scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" or "mechanism for" or "step for". Sub-generic embodiments of this disclosure are delineated by the appended independent claims and their equivalents. Specific embodiments of this disclosure are differentiated by the appended dependent claims and their equivalents.

What is claimed is:

1. A method, comprising: cancelling substantially composite second order distortion from at least 1) a dispersion-slope of an optical component and 2) frequency chirp of an optical transmitter using a distortion compensation circuit including a parallel combination of an input signal I(t) and a secondary path where a predistortion signal $I_{predis}(t)$ is generated according to $$I_{predis} = G_{opt} \frac{d(I^2)}{dt}$$

wherein $G_{opt}$ is a parameter independent of I(t) and is proportional to the dispersion slope $S_{opt}$ of the optical component according to $$G_{opt} = \left(\frac{P_0 S_{opt}}{S_{las}}\right)\left(\frac{\lambda^4}{2c^2}\right)\eta_{FM}^2$$

wherein $\lambda$ denotes the wavelength of the optical signal, c denotes the speed of light in a vacuum, $\eta_{FM}$ denotes the laser chirp (also known as the laser FM efficiency) in units of MHz/mA, $P_0$ is the average power output of the laser in mW, $S_{las}$ denotes the slope of the laser light-current characteristic in units of mW/mA and $S_{opt}$ denotes the dispersion-slope of the optical component in units of ps/nm² at wavelength $\lambda$.

2. The method of claim 1, wherein the distortion compensation circuit includes
a 1×n electrical coupler;
a primary signal path including an RF delay line coupled to the 1×n coupler, the primary signal path receiving a first portion of an input signal;
a n×1 electrical coupler coupled to the primary signal path; and
a secondary signal path coupled to both i) the 1×n coupler and ii) the n×1 coupler and in parallel to the primary signal path, the secondary signal path receiving a second portion of the input signal and including
an RF delay line,
an RF attenuator,
an amplifier with electrical current gain proportional to the dispersion-slope of the optical component,
a circuit that squares the signal current and
a circuit whose output is the derivative of its input signal.

3. The method of claim 2, further comprising an optical transmitter that follows the distortion compensation circuit by means of an electrical connection to the n×1 coupler of the compensation circuit.

4. The method of claim 2, further comprising an optical receiver that precedes the distortion compensation circuit by means of an electrical input coupled to the 1×n coupler of the compensation circuit.

5. The method of claim 2, wherein the amplifier has electrical current gain proportional to both the dispersion-slope of the optical component and the dispersion of another optical component.

6. The method of claim 2, wherein the amplifier includes a voltage-controlled-amplifier whose gain can be adjusted by an error voltage, and further including a band pass filter coupled to the voltage-controlled-amplifier.

7. The method of claim 2, wherein the secondary signal path includes a secondary signal path voltage-controlled attenuator, and further including a band pass filter coupled to the secondary signal path voltage-controlled attenuator.

8. The method of claim 2, further comprising an 1×2 optical coupler whose input is connected to the output of the optical component and one optical output of which provides an adaptive feedback path including
a photodiode,
a band-pass filter and
a gain control circuit that is connected to a voltage-controlled amplifier or voltage-controlled attenuator in the secondary path of the dispersion compensation circuit.

9. The method of claim 2, further comprising a ternary signal path coupled to both i) the 1×n coupler and ii) the n×1 coupler and in parallel to both a) the primary signal path and b) the secondary signal path, the ternary signal path receiving a third portion of the input signal and including
another amplifier with electrical current gain proportional to the dispersion of another optical component,
another circuit that squares the input current,
another circuit whose output is the derivative of its input signal,
another RF delay line and
another RF attenuator.

10. The method of claim 2, wherein the circuit that squares the signal current in the secondary path is replaced by a multiplier circuit that multiplies a portion of the signal from the primary path with the output of the differentiator circuit in the secondary path.

11. An apparatus, comprising a distortion compensation circuit to substantially cancel composite second order distortion generated by at least 1) a dispersion-slope of an optical component and 2) frequency chirp of an optical transmitter, the distortion compensation circuit including
a 1×n electrical coupler;
a primary signal path including an RF delay line coupled to the 1×n coupler, the primary signal path receiving a first portion of an input signal;
a n×1 electrical coupler coupled to the primary signal path; and
a secondary signal path coupled to both i) the 1×n coupler and ii) the n×1 coupler and in parallel to the primary signal path, the secondary signal path receiving a second portion of the input signal and including
an RF delay line,
an RF attenuator,
an amplifier with electrical current gain proportional to the dispersion-slope of the optical component,
a circuit that squares the signal current and
a circuit whose output is the derivative of its input signal,
wherein the amplifier includes a voltage-controlled-amplifier whose gain can be adjusted by an error voltage, and further including a band pass filter coupled to the voltage-controlled-amplifier.

12. The apparatus of claim 11, further comprising an 1×2 optical coupler whose input is connected to the output of the optical component and one optical output of which provides an adaptive feedback path including
- a photodiode,
- a band-pass filter and
- a gain control circuit that is connected to a voltage-controlled amplifier in the secondary path of the dispersion compensation circuit.

13. An apparatus, comprising a distortion compensation circuit to substantially cancel composite second order distortion generated by at least 1) a dispersion-slope of an optical component and 2) frequency chirp of an optical transmitter, the distortion compensation circuit including
- a 1×n electrical coupler;
- a primary signal path including an RF delay line coupled to the 1×n coupler, the primary signal path receiving a first portion of an input signal;
- a n×1 electrical coupler coupled to the primary signal path; and
- a secondary signal path coupled to both i) the 1×n coupler and ii) the n×1 coupler and in parallel to the primary signal path, the secondary signal path receiving a second portion of the input signal and including
  - an RF delay line,
  - an RF attenuator,
  - an amplifier with electrical current gain proportional to the dispersion-slope of the optical component,
  - a circuit that squares the signal current and
- a circuit whose output is the derivative of its input signal,
  - wherein the secondary signal path includes a secondary signal path voltage-controlled attenuator, and further including a band pass filter coupled to the secondary signal path voltage-controlled attenuator.

14. The apparatus of claim 13, further comprising an 1×2 optical coupler whose input is connected to the output of the optical component and one optical output of which provides an adaptive feedback path including
- a photodiode,
- a band-pass filter and
- a gain control circuit that is connected to a voltage-controlled attenuator in the secondary path of the dispersion compensation circuit.

15. An apparatus, comprising a distortion compensation circuit to substantially cancel composite second order distortion generated by at least 1) a dispersion-slope of an optical component and 2) frequency chirp of an optical transmitter, the distortion compensation circuit including
- a 1×n electrical coupler;
- a primary signal path including an RF delay line coupled to the 1×n coupler, the primary signal path receiving a first portion of an input signal;
- a n×1 electrical coupler coupled to the primary signal path; and
- a secondary signal path coupled to both i) the 1×n coupler and ii) the n×1 coupler and in parallel to the primary signal path, the secondary signal path receiving a second portion of the input signal and including
  - an RF delay line,
  - an RF attenuator,
  - an amplifier with electrical current gain proportional to the dispersion-slope of the optical component,
  - a circuit that squares the signal current and
- a circuit whose output is the derivative of its input signal,
  - wherein the circuit that squares the signal current in the secondary path is replaced by a multiplier circuit that multiplies a portion of the signal from the primary path with the output of the differentiator circuit in the secondary path.

16. An apparatus, comprising a distortion compensation circuit to substantially cancel composite second order distortion generated by at least 1) a dispersion-slope of an optical component and 2) frequency chirp of an optical transmitter, the distortion compensation circuit including
- a 1×n electrical coupler;
- a primary signal path including an RF delay line coupled to the 1×n coupler, the primary signal path receiving a first portion of an input signal;
- a n×1 electrical coupler coupled to the primary signal path; and
- a secondary signal path coupled to both i) the 1×n coupler and ii) the n×1 coupler and in parallel to the primary signal path, the secondary signal path receiving a second portion of the input signal and including
  - an RF delay line,
  - an RF attenuator,
  - an amplifier with electrical current gain proportional to the dispersion-slope of the optical component,
  - a circuit that squares the signal current and
- a circuit whose output is the derivative of its input signal,
  - further comprising a ternary signal path coupled to both i) the 1×n coupler and ii) the n×1 coupler and in parallel to both a) the primary signal path and b) the secondary signal path, the ternary signal path receiving a third portion of the input signal and including
    - another amplifier with electrical current gain proportional to the dispersion of another optical component,
    - another circuit that squares the input current,
    - another circuit whose output is the derivative of its input signal,
    - another RF delay line and
    - another RF attenuator.

17. The apparatus of claim 16, wherein the ternary signal path includes a ternary signal path voltage-controlled amplifier and/or a voltage-controlled attenuator whose gain and/or attenuation can be adjusted by an error voltage, and further including a band pass filter coupled to the voltage-controlled-amplifier and/or the voltage-controlled-attenuator.

18. The apparatus of claim 17, further comprising an 1×2 optical coupler whose input is connected to the output of the optical component and one optical output of which provides an adaptive feedback path including
- a photodiode,
- a band-pass filter and
- a gain control circuit that is connected to a voltage-controlled amplifier or voltage-controlled attenuator in the ternary signal path of the dispersion compensation circuit.

* * * * *